(12) United States Patent
Loehr et al.

(10) Patent No.: US 12,550,170 B2
(45) Date of Patent: Feb. 10, 2026

(54) CONFIGURING RESOURCES CORRESPONDING TO DISCONTINUOUS RECEPTION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 317 days.

(21) Appl. No.: 18/258,264

(22) PCT Filed: Dec. 17, 2021

(86) PCT No.: PCT/IB2021/061891
§ 371 (c)(1),
(2) Date: Jun. 19, 2023

(87) PCT Pub. No.: WO2022/130302
PCT Pub. Date: Jun. 23, 2022

(65) Prior Publication Data
US 2024/0040593 A1 Feb. 1, 2024

Related U.S. Application Data

(60) Provisional application No. 63/127,931, filed on Dec. 18, 2020.

(51) Int. Cl.
*H04W 72/40* (2023.01)
*H04W 76/28* (2018.01)

(52) U.S. Cl.
CPC .......... *H04W 72/40* (2023.01); *H04W 76/28* (2018.02)

(58) Field of Classification Search
CPC .............................. H04W 72/40; H04W 76/28
(Continued)

(56) References Cited

U.S. PATENT DOCUMENTS

2020/0275474 A1 8/2020 Chen
2021/0185761 A1* 6/2021 Narula ................ H04L 41/0803

FOREIGN PATENT DOCUMENTS

WO  WO-2022246667 A1 * 12/2022 ............ H04W 52/02

OTHER PUBLICATIONS

PCT/IB2021/061891, "Notification of Transmittal of the International Search Report and the Written Opinion of the International Searching Authority, or the Declaration", International Searching Authority, May 11, 2022, pp. 1-19.
(Continued)

*Primary Examiner* — Christopher R Crompton
(74) *Attorney, Agent, or Firm* — Kunzler Needham & Hilton (57) ABSTRACT

Apparatuses, methods, and systems for configuring resources corresponding to discontinuous reception. One method includes receiving, at a user equipment (UE), a sidelink grant from a network entity allocating sidelink resources. The method includes determining whether the sidelink resources allocated by the sidelink grant are within a discontinuous reception active time of the UE. Determining whether the sidelink resources allocated by the sidelink grant are within the discontinuous reception active time of the user equipment includes determining whether the allocated resources are within the discontinuous reception active time of any receiving UE that the user equipment has data available for transmission. The method includes, in response
(Continued)

to determining that the allocated resources are not within the discontinuous reception active time of the UE, ignoring the received sidelink grant and not performing a sidelink transmission on the allocated sidelink resources.

15 Claims, 7 Drawing Sheets

(58) Field of Classification Search
USPC .......................................................... 370/329
See application file for complete search history.

(56) References Cited

OTHER PUBLICATIONS

LG Electronics, "Discussion on physical layer design considering sidelink DRX operation", 3GPP TSG RAN WG1 #103-e R1-2007897, Oct. 26-Nov. 13, 2020, pp. 1-15.
Huawei et al., "Consideration on the sidelink DRX for unicast, groupcast and broadcast", 3GPP TSG-RAN WG2 Meeting #112 electronic R2-2009413, Nov. 2-13, 2020, pp. 1-8.
Lenovo et al., "Discontinuous reception and transmission in SL", 3GPP TSG-RAN WG2 Meeting #112 electronic R2-2009696, Nov. 2-13, 2020, pp. 1-7.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.4.0, Sep. 2020, pp. 1-58.
3GPP, "3rd Generation Partnership Project; Technical Specification Group Radio Access Network; NR; Physical channels and modulation (Release 16)", 3GPP TS 38.211 V16.3.0, Sep. 2020, pp. 1-133.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

\* cited by examiner

SCI format 1-A is used for the scheduling of PSSCH and 2$^{nd}$-stage-SCI on PSSCH The following information is transmitted by means of the SCI format 1-A:

- Priority – 3 bits as specified in clause 5.4.3.3 of [12, TS 23.287] and clause 5.22.1.3.1 of [8, TS 38.321].

- Frequency resource assignment – bits when the value of the higher layer parameter *sl-MaxNumPerReserve* is configured to 2; otherwise bits when the value of the higher layer parameter *sl-MaxNumPerReserve* is configured to 3, as defined in clause 8.1.2.2 of [6, TS 38.214].

- Time resource assignment – 5 bits when the value of the higher layer parameter *sl-MaxNumPerReserve* is configured to 2; otherwise 9 bits when the value of the higher layer parameter *sl-MaxNumPerReserve* is configured to 3, as defined in clause 8.1.2.1 of [6, TS 38.214].

- Resource reservation period – bits as defined in clause 8.1.4 of [6, TS 38.214], where is the number of entries in the higher layer parameter *sl-ResourceReservePeriodList*, if higher layer parameter *sl-MultiReserveResource* is configured; 0 bit otherwise.

- DMRS pattern – bits as defined in clause 8.4.1.1.2 of [4, TS 38.211], where is the number of DMRS patterns configured by higher layer parameter *sl-PSSCH-DMRS-TimePatternList*.

- 2$^{nd}$-stage SCI format – 2 bits as defined in Table 8.3.1.1-1.

- Beta_offset indicator – 2 bits as provided by higher layer parameter *sl-BetaOffsets2ndSCI* and Table 8.3.1.1-2.

- Number of DMRS port – 1 bit as defined in Table 8.3.1.1-3.

- Modulation and coding scheme – 5 bits as defined in clause 8.1.3 of [6, TS 38.214].

- Additional MCS table indicator – as defined in clause 8.1.3.1 of [6, TS 38.214]: 1 bit if one MCS table is configured by higher layer parameter *sl-Additional-MCS-Table*; 2 bits if two MCS tables are configured by higher layer parameter *sl- Additional-MCS-Table*; 0 bit otherwise.

- PSFCH overhead indication – 1 bit as defined clause 8.1.3.2 of [6, TS 38.214] if higher layer parameter *sl-PSFCH-Period* = 2 or 4; 0 bit otherwise.

- Reserved – a number of bits as determined by higher layer parameter *sl-NumReservedBits*, with value set to zero.

CONFIGURING RESOURCES CORRESPONDING TO DISCONTINUOUS RECEPTION

CROSS-REFERENCE TO RELATED APPLICATIONS

This application claims priority to U.S. Patent Application Ser. No. 63/127,931 entitled "APPARATUSES, METHODS, AND SYSTEMS FOR EFFICIENT SIDELINK DRX MECHANISM" and filed on Dec. 18, 2020 for Joachim Loehr, which is incorporated herein by reference in its entirety.

FIELD

The subject matter disclosed herein relates generally to wireless communications and more particularly relates to configuring resources corresponding to discontinuous reception.

BACKGROUND

In certain wireless communications networks, discontinuous reception may occur. In such networks, sidelink grants may have resources within a discontinuous reception active time.

BRIEF SUMMARY

Methods for configuring resources corresponding to discontinuous reception are disclosed. Apparatuses and systems also perform the functions of the methods. One embodiment of a method includes receiving, at a user equipment, a sidelink grant from a network entity allocating sidelink resources. In some embodiments, the method includes determining whether the sidelink resources allocated by the sidelink grant are within a discontinuous reception active time of the user equipment. Determining whether the sidelink resources allocated by the sidelink grant are within the discontinuous reception active time of the user equipment includes determining whether the allocated resources are within the discontinuous reception active time of any receiving user equipment that the user equipment has data available for transmission. In certain embodiments, the method includes, in response to determining that the allocated resources are not within the discontinuous reception active time of the user equipment, ignoring the received sidelink grant and not performing a sidelink transmission on the allocated sidelink resources.

One apparatus for configuring resources corresponding to discontinuous reception includes a user equipment. In some embodiments, the apparatus includes a receiver that receives, at a user equipment, a sidelink grant from a network entity allocating sidelink resources. In various embodiments, the apparatus includes a processor that: determines whether the sidelink resources allocated by the sidelink grant are within a discontinuous reception active time of the user equipment, wherein determining whether the sidelink resources allocated by the sidelink grant are within the discontinuous reception active time of the user equipment includes determining whether the allocated resources are within the discontinuous reception active time of any receiving user equipment that the user equipment has data available for transmission; and, in response to determining that the allocated resources are not within the discontinuous reception active time of the user equipment, ignores the received sidelink grant and not performing a sidelink transmission on the allocated sidelink resources.

Another embodiment of a method for configuring resources corresponding to discontinuous reception includes receiving, at a user equipment, sidelink control information on a physical sidelink control channel at a user equipment. In some embodiments, the method includes determining whether the sidelink control information indicates that hybrid automatic repeat request feedback is disabled for an associated transport block received on a physical sidelink shared channel. In certain embodiments, the method includes starting, at the user equipment, a first timer in response to determining that hybrid automatic repeat request feedback is disabled for an associated transport block received on the physical sidelink shared channel.

Another apparatus for configuring resources corresponding to discontinuous reception includes a user equipment. In some embodiments, the apparatus includes a receiver that receives sidelink control information on a physical sidelink control channel at a user equipment. In various embodiments, the apparatus includes a processor that: determines whether the sidelink control information indicates that hybrid automatic repeat request feedback is disabled for an associated transport block received on a physical sidelink shared channel; and starts, at the user equipment, a first timer in response to determining that hybrid automatic repeat request feedback is disabled for an associated transport block received on the physical sidelink shared channel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a SCI format 1-A;

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
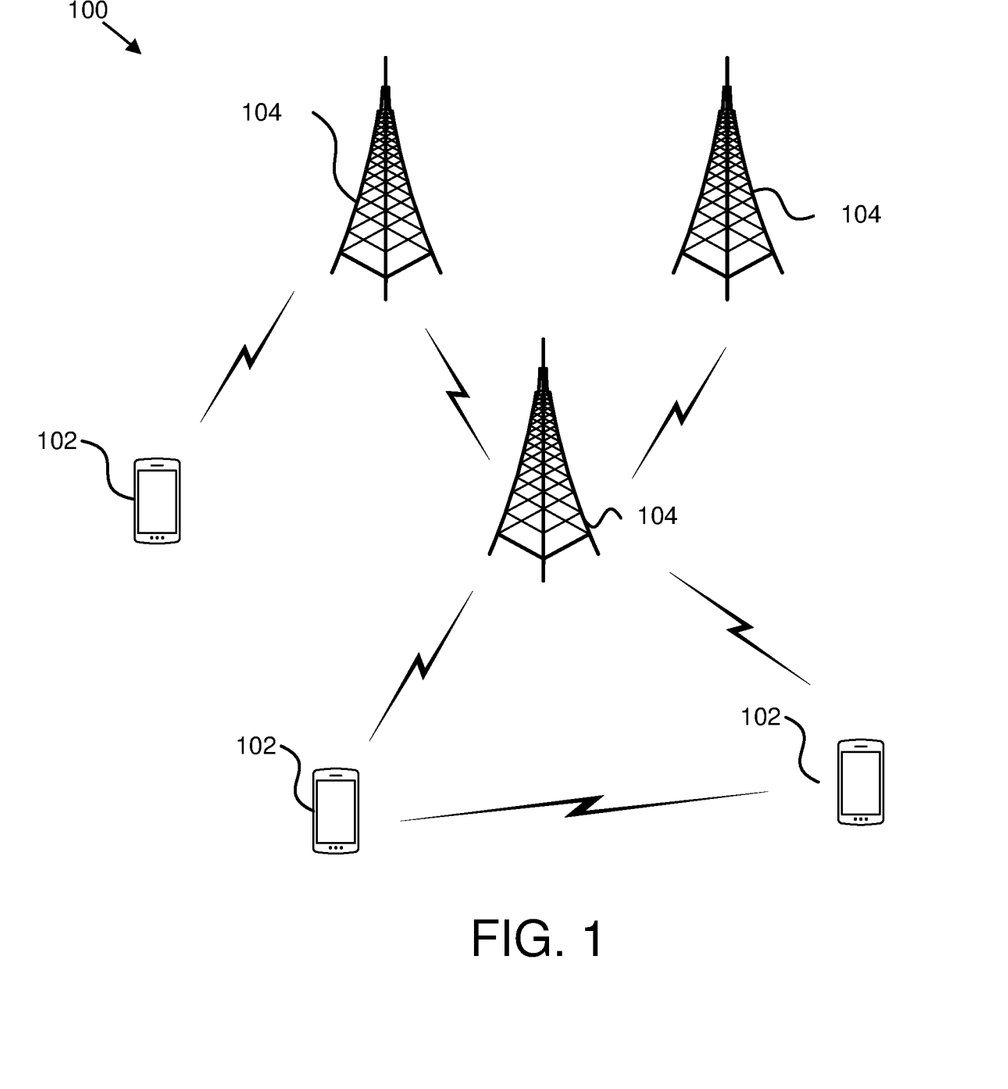
FIG. 1 is a schematic block diagram illustrating one embodiment of a wireless communication system for configuring resources corresponding to discontinuous reception.

FIG. 1 depicts an embodiment of a wireless communication system 100 for configuring resources corresponding to discontinuous reception. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment, a sidelink grant from a network entity allocating sidelink resources. In some embodiments, the remote unit 102 may determine whether the sidelink resources allocated by the sidelink grant are within a discontinuous reception active time of the user equipment. Determining whether the sidelink resources allocated by the sidelink grant are within the discontinuous reception active time of the user equipment includes determining whether the allocated resources are within the discontinuous reception active time of any receiving user equipment that the user equipment has data available for transmission. In certain embodiments, the remote unit 102 may, in response to determining that the allocated resources are not within the discontinuous reception active time of the user equipment, ignore the received sidelink grant and not performing a sidelink transmission on the allocated sidelink resources. Accordingly, the remote unit 102 may be used for configuring resources corresponding to discontinuous reception.

In certain embodiments, a remote unit 102 may receive, at a user equipment, sidelink control information on a physical sidelink control channel at a user equipment. In some embodiments, the remote unit 102 may determine whether the sidelink control information indicates that hybrid automatic repeat request feedback is disabled for an associated transport block received on a physical sidelink shared channel. In certain embodiments, the remote unit 102 may start, at the user equipment, a first timer in response to determining that hybrid automatic repeat request feedback is disabled for an associated transport block received on the physical sidelink shared channel. Accordingly, the remote unit 102 may be used for configuring resources corresponding to discontinuous reception.

Figure 2:
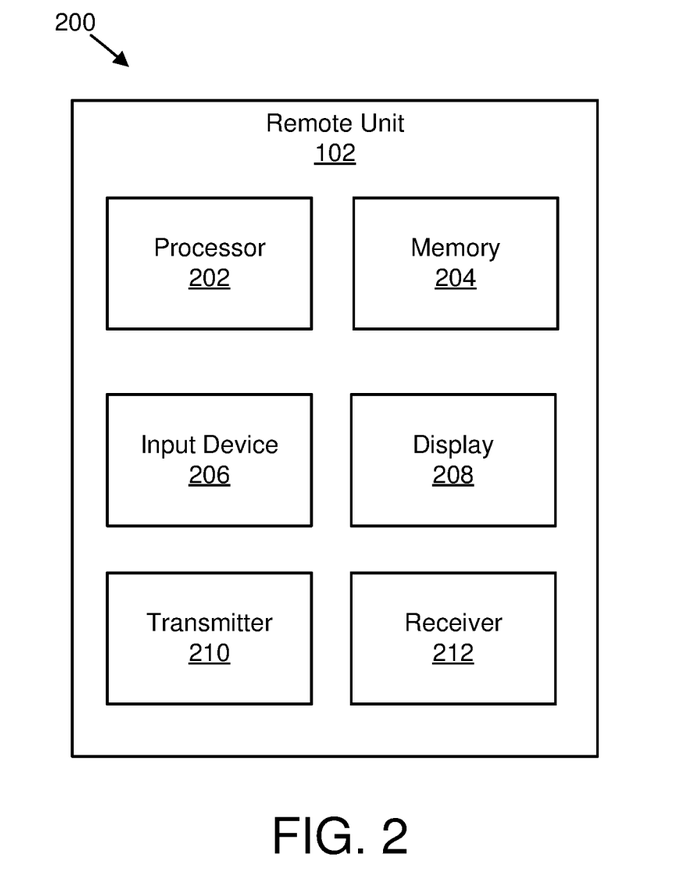
FIG. 2 is a schematic block diagram illustrating one embodiment of an apparatus that may be used for configuring resources corresponding to discontinuous reception.

FIG. 2 depicts one embodiment of an apparatus 200 that may be used for configuring resources corresponding to discontinuous reception. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives, at a user equipment, a sidelink grant from a network entity allocating sidelink resources. In various embodiments, the processor 202: determines whether the sidelink resources allocated by the sidelink grant are within a discontinuous reception active time of the user equipment, wherein determining whether the sidelink resources allocated by the sidelink grant are within the discontinuous reception active time of the user equipment includes determining whether the allocated resources are within the discontinuous reception active time of any receiving user equipment that the user equipment has data available for transmission; and, in response to determining that the allocated resources are not within the discontinuous reception active time of the user equipment, ignores the received sidelink grant and not performing a sidelink transmission on the allocated sidelink resources.

In some embodiments, the receiver 212 receives sidelink control information on a physical sidelink control channel at a user equipment. In various embodiments, the processor 202: determines whether the sidelink control information indicates that hybrid automatic repeat request feedback is disabled for an associated transport block received on a physical sidelink shared channel; and starts, at the user equipment, a first timer in response to determining that hybrid automatic repeat request feedback is disabled for an associated transport block received on the physical sidelink shared channel.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
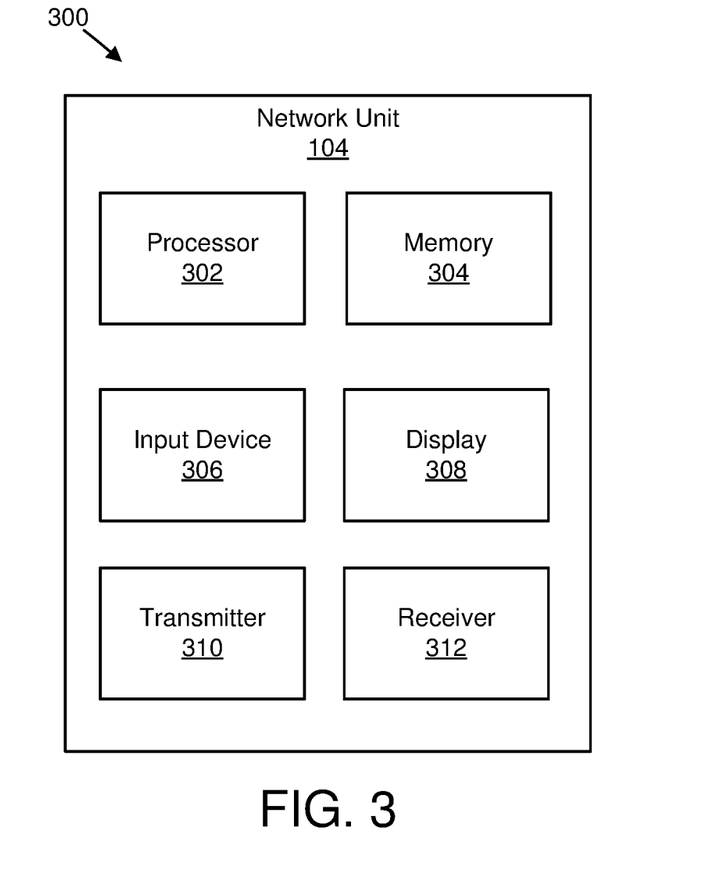
FIG. 3 is a schematic block diagram illustrating one embodiment of an apparatus that may be used for configuring resources corresponding to discontinuous reception.

FIG. 3 depicts one embodiment of an apparatus 300 that may be used for configuring resources corresponding to discontinuous reception. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, such as in a user equipment ("UE") to network interface ("Uu") discontinuous reception ("DRX"), a drx-InactivityTimer is started for initial transmissions (downlink ("DL") and/or uplink ("UL")), whereas drx-RetransmissionTimerUL/DL is used to ensure that the UE is monitoring physical downlink control channel ("PDCCH") for potential retransmissions. In some embodiments, such as for new radio ("NR") Uu, there may be only one hybrid automatic repeat request ("HARQ") transmission mode (e.g., HARQ feedback-based transmission mode where retransmissions are dynamically scheduled by downlink control information ("DCI")). In various embodiments, such as for a receiving side (e.g., DL) of a UE on NR Uu, a drx-RetransmissionTimerDL is started based on HARQ feedback sent in an uplink (e.g., non-acknowledgment ("NACK")). In certain embodiments, such as for sidelink operation, there may be two different HARQ transmission modes: 1) HARQ feedback based retransmissions; and 2) blind retransmissions (e.g., without HARQ feedback).

In some embodiments, blind retransmissions may be handled within a sidelink ("SL") DRX procedure (e.g., ensuring that peer receive ("RX") UEs are in an ActiveTime for retransmissions if there is no HARQ feedback enabled).

In various embodiments, if a SL ActiveTime on a UE to UE interface ("PC5") is not synchronized between a transmit ("TX") UE and a gNB, the gNB may allocate SL resources that are outside the TX UE's ActiveTime (e.g., and outside the ActiveTime of a specific destination). In such embodiments, the TX UE behaviour may be specified and the gNB may avoid allocating SL resources that are not within the ActiveTime of the TX UE.

In certain embodiments, such as in various embodiments found herein, each SL logical channel ("LCH"), SL service, SL application, and/or SL destination is associated with a (pre)configured and/or fixed SL-DRX-configuration that is defined (e.g., as a combination of offset_std_On-duration, On-duration-timer, and periodicity). In some embodiments, a SL On-duration starts at a fixed time offset (e.g., offset_std_On-duration) from Time_0 based on a sync source from global navigation satellite system ("GNSS") or gNB directly or indirectly from sidelink synchronization signals ("SLSS"). In various embodiments, an On-duration-timer is restarted periodically with a periodicity. It should be noted that the term SL "ActiveTime" may refer to a time period where a SL UE transmits and receives data and/or control on a PC5 interface.

In certain embodiments, a predefined destination-specific SL DRX pattern and/or configuration ensures that the SL data transmissions for a specific application, service, destination, and/or LCH are synchronized between UEs interested in such a service and/or application. In such embodiments, the TX side of a UE may need to be aware of when RX UEs are "listening" for data of a specific SL LCH and/or application and the RX side of the UE needs to know when to monitor for SL data and/or control of a specific SL LCH and/or application. Such SL DRX pattern and/or configuration may improve UE's power consumption, as a UE interested in a particular SL service and/or application needs to be only "active" on the PC5 interface (e.g., monitor for sidelink control information ("SCI") and/or physical sidelink shared channel ("PSSCH"), at specific predefined time periods. It may be also possible that a sidelink UE uses two separate DRX patterns and/or ActiveTimes (e.g., one ActiveTime defining when the SL UE when acting as a transmitter is allowed to transmit SL data and/or control on the PC5 interface to the peer RX UEs and another separate DRX pattern and/or ActiveTime determining when the same SL UE, acting as a receiving UE (e.g., RX UE) is receiving SL data and/or control from the peer UE. It should be noted that the embodiments disclosed here are equally applicable multiple approaches (e.g., one "common" DRX pattern and/or ActiveTime per sidelink UE or two separate DRX patterns and/or ActiveTimes per SL UE (e.g., one for TX side and one for RX side).

In some embodiments, a DRX related timer is started at a receiving UE upon receiving SCI indicating the transmission of a transport block ("TB") in a blind retransmission mode (e.g., when HARQ feedback is not enabled (e.g., disabled) for the transmission of the TB and, therefore, the peer receiver RX UEs are not required to send any HARQ feedback to this transmission). While the timer is running, the receiving UE considers itself to be in ActiveTime (e.g., ready to receive and transmit SL data and/or control on the PC5 interface). The indication of whether HARQ feedback is enabled or disabled may be carried in 2nd stage SCI (e.g., field "HARQ feedback enabled and/or disabled indicator" in the SCI format 2-A and/or B). To have a synchronized ActiveTime between a TX UE and peer RX UEs, similar to a receiver UE, a transmitter UE also starts the timer upon transmitting an SCI indicating the transmission of a TB in the blind retransmission mode. The value of the timer may be configured (or preconfigured). In various embodiments, a value of the timer is associated with a priority of a TB as indicated in SCI. In certain embodiments, a relationship between priority (e.g., quality of service ("QoS")) information signalled within SCI and a maximum tolerable transmission delay (e.g., timer value) of a TB is configured, preconfigured, or specified (e.g., hardcoded in a specification). In some embodiments, a timer may be used to ensure that an RX UE is in ActiveTime if a TX UE transmits a retransmission (e.g., blind) of the TB. In various embodiments, an RX UE may stop a timer upon successfully decoding a TB and enter sleep mode. In such embodiments, it may not be necessary to stay in an ActiveTime and monitor for further retransmissions if the TB may be already successfully decoded. It should be noted that for a Uu interface there may only be a HARQ feedback-based retransmissions mechanism (e.g., no HARQ blind retransmission like for sidelink). Therefore, for a DRX procedure on Uu, a drx-InactivityTimer is started for initial transmissions (e.g., DL and/or UL) and drx-RetransmissionTimerUL/DL may take care of HARQ retransmissions (e.g., while drx-RetransmissionTimerUL/DL is running, UE is in ActiveTime monitoring PDCCH for retransmissions). For a receiving side (e.g., DL) of the UE on NR Uu, the drx-RetransmissionTimerDL is started based on the HARQ feedback sent in the uplink (e.g., NACK), e.g. drx-RetransmissionTimerDL is started upon the expiry of the drx-HARQ-RTT-TimerDL which is started upon having sent a NACK in the UL. Since for the PC5 interface there are two HARQ transmission modes (e.g., HARQ feedback based retransmissions and HARQ blind retransmissions without HARQ feedback), a timer (e.g., drx-BlindRetransmissionTimer) may be used to facilitate ActiveTime being adapted and/or extended such that it includes the slots where the blind retransmission of a TB are taking place.

In various embodiments, depending on whether HARQ feedback is enabled or disabled, a different UE behavior may be used. If SCI indicates that HARQ feedback is disabled, (e.g., blind retransmission mode), a RX UE starts a timer at the reception of the SCI. If SCI indicates that HARQ feedback is enabled, the RX UE may start a different timer and consider itself to be in ActiveTime (e.g., while this timer is running) upon having sent a NACK on a feedback channel (e.g., physical sidelink feedback channel ("PSFCH")).

In certain embodiments, a receiving UE considers time resources and/or slots indicated in SCI as reserved resources (e.g., for further transmissions and/or retransmissions) to be part of DRX ActiveTime. In some embodiments, a peer TX UE considers those slots and/or subframes indicated within SCI as DRX ActiveTime (e.g., TX UE is allowed to transmit in those sidelink slots). FIG. 4 is a diagram illustrating one embodiment of a SCI format 1-A 400. As shown in FIG. 4, a time resource assignment field may indicate multiple different (e.g., reserved) time resources (e.g., slots), where future transmissions and/or retransmissions take place.

In various embodiments, an RX UE may enter sleep (e.g., DRX) with respect to the transmissions from a given source at further indicated reserved time resources (e.g., slots) upon having sent an acknowlegement ("ACK"). If the RX UE has successfully decoded a TB, the RX doesn't need to monitor for further retransmissions of the TB at the indicated time resources (e.g., slots) and may stop monitoring for SCI and PSSCH at the indicated time resources (e.g., RX UE considers the further indicated time resources as DRX (e.g., OFF) time, i.e. RX UE is not receiving and transmitting a physical sidelink control channel ("PSCCH"), PSSCH, and/or PSFCH). Moreover, a TX UE may consider further time resources (e.g., slots) indicated within the SCI as DRX (e.g., OFF) time upon reception of an ACK from a receiving UE.

In certain embodiments, when transmitting to a group of UEs using groupcast mode of transmission, a transmitter may explicitly indicate if resource reservations indicated in SCI shall only be used for retransmission of the corresponding PSSCH or not. In the latter case, the transmitter may start transmission of the next PSSCH (e.g., a new TB). The receivers may use this information to decide if they need to enter sleep once having successfully decoded a current PSSCH (e.g., associated with the just received SCI). If the transmitter indicates that reservations indicated in the SCI shall only be used for retransmission of the corresponding PSSCH, the receivers, upon successfully decoding the PSSCH, may go to sleep with respect to the transmissions from this source UE; otherwise, it may remain awake.

In some embodiments, a TX UE doesn't perform a SL transmission on SL resources allocated by a gNB if the SL resources are not within the DRX ActiveTime of the TX UE. If the TX UE would perform the transmission of SL data outside its and the destination's ActiveTime, the corresponding peer receiving UEs may not be ready to receive this SL transmission (e.g., RX UEs are not monitoring for PSSCH and/or PSSCH in slots outside their ActiveTime). Therefore, a SL transmission outside the sidelink ActiveTime may be a waste of resources and transmission power.

In various embodiments, a TX UE doesn't perform a SL transmission on SL resources allocated by a gNB if the SL resources are not within the DRX ActiveTime of the TX UE and sends a feedback response message to the gNB. In certain embodiments, a feedback response message indicates that a TX UE will not use the allocated SL transmission due to the SL resources not being within the DRX ActiveTime. An uplink control information (UCI) message and/or signal may be used (e.g., signal transmitted on PUCCH (e.g., preallocated)) for indicating that a TX UE skipped the allocated SL resources due to DRX mismatch. In some embodiments, a medium access control ("MAC") control element ("CE") may be used to inform a gNB of the DRX mismatch (e.g., allocated SL resources are not within DRX ActiveTime). Using a MAC CE for indicating that allocated SL resources are not used due to a DRX mismatch may have an advantage because the indication may be done as soon as possible after the reception of the SL grant. In various embodiments, transmission of a MAC CE is triggered in response to reception of a SL grant (e.g., if a TX UE determined that the allocated SL resources are not within the ActiveTime (e.g., TX ActiveTime)). In certain embodiments, a TX UE sends an ACK to a gNB in response to receiving a SL grant allocating SL resources that are not within its DRX ActiveTime (e.g., on preallocated PUCCH resources).

In certain embodiments, a TX UE considers only those SL LCHs for a logical channel prioritization ("LCP") procedure and/or destination selection whose corresponding DRX ActiveTime matches with the allocated SL resources (e.g., SL resources allocated by a gNB are within the DRX ActiveTime of the SL LCHs/destinations). If the UE has SL data of SL LCH "x" in its buffer when a SL grant is received and the DRX ActiveTime associated with SL LCH "x" doesn't overlap with the SL resources (e.g., allocted by a SL grant), the UE may not consider SL LCH "x" for LCP (e.g., destination selection). It should be noted that the TX UE may have different DRX patterns and/or ActiveTimes for different destinations (e.g., DRX patterns and/or ActiveTimes are defined per source-destination pair). If there is not a single LCH across any of the destinations that fulfill this (e.g., gNB grant does not fall inside of the DRX active time), the UE informs the gNB about this.

In some embodiments, if a sidelink UE has two separate DRX configurations and/or ActiveTimes (e.g., one for transmitting and another for receiving), the UE may indicate to a gNB about skipping a SL grant if allocated SL resources don't fall within the ActiveTime of the transmission DRX configuration (e.g., are mismatched SL resources). In various embodiments, a transmitter UE may indicate to a gNB about a need to skip a SL grant. This may be done if: 1) received SL resources are within an ActiveTime of a receiving DRX configuration that is just about to start (e.g., on-duration timer starts) of a transmitter UE—upon starting the DRX ActiveTime to receive, the associated TX UE may not transmit data using the mis-matched SL resources; and/or 2) all the concerned peer receivers may start with their transmission AcitveTime and therefore none of these may receive data transmitted by the transmitter UE using the SL resources.

In various embodiments, the transmitter selects a destination based on the knowledge of the destination's transmission cycle and performs LCP for the qualifying LCHs of this destination and a transmission is made to the selected destination.

In certain embodiments, a TX UE signals to a gNB a DRX pattern and/or ActiveTime information per destination. To allow a gNB to efficiently schedule SL resources for a TX UE, the gNB may be aware of the slots the TX UE is in ActiveTime for a specific destination (e.g., SL service). Without this knowledge, it may happen that the gNB allocates SL resources to the TX UE which the TX UE cannot use since the corresponding destination and/or peer receiving UEs are not in ActiveTime. For example, if the TX UE reports a certain amount of data available for transmission for a specific destination, the gNB needs to know when the peer receiving UEs associated with this destination are in ActiveTime to allocated SL resources efficiently. It should be noted that the sidelink buffer status report ("BSR") signalled to the gNB may include a buffer status per destination.

Figure 5:
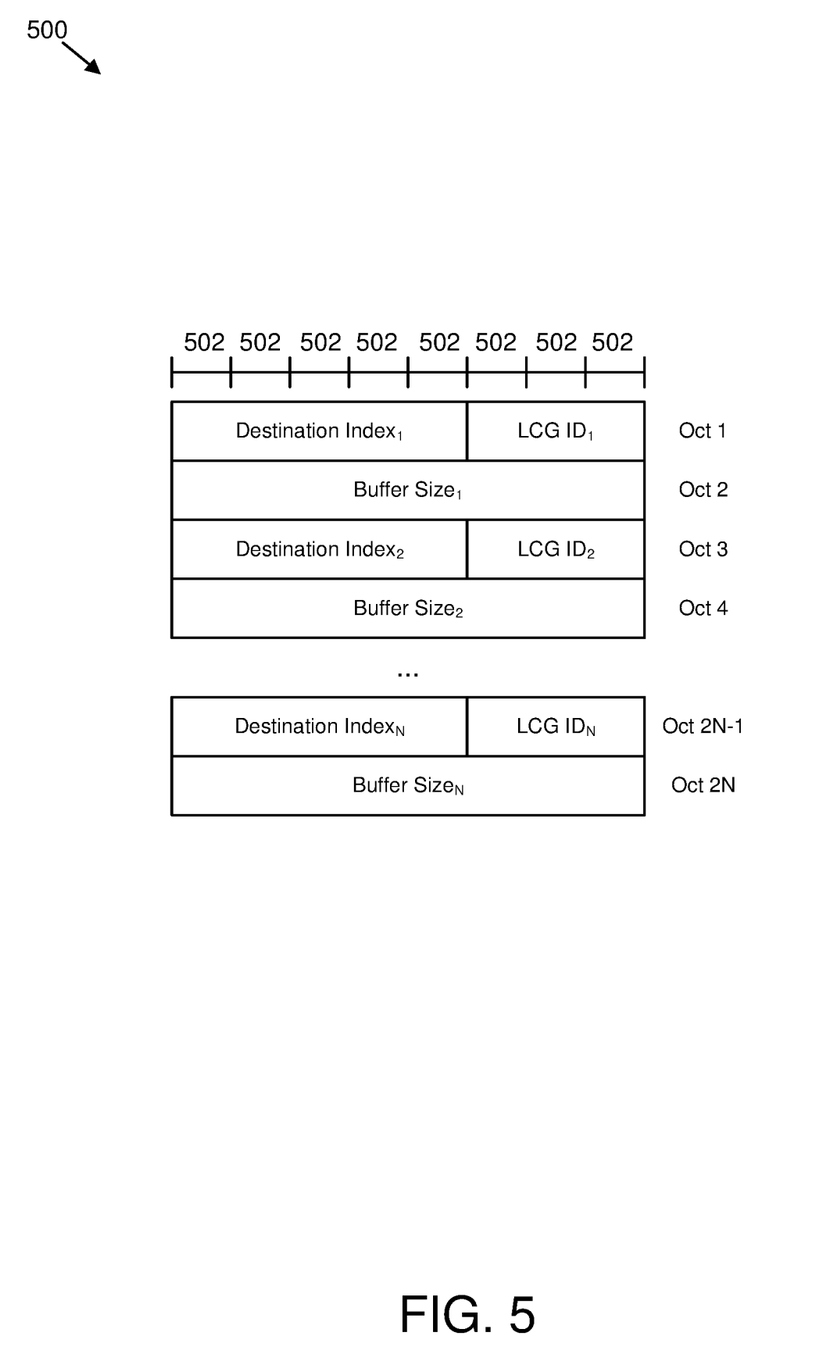
FIG. 5 is a schematic block diagram illustrating one embodiment of a SL BSR.

FIG. 5 is a schematic block diagram 500 illustrating one embodiment of a SL BSR (e.g., SL-BSR and truncated SL-BSR MAC control element). The SL BSR includes 8 symbols 502 per octet (e.g., Oct 1, Oct 2, Oct 3, Oct 4, Oct 2N-1, Oct 2N).

In some embodiments, information on ActiveTime information and/or DRX patterns per destination may be reported using a MAC CE or radio resource control ("RRC") signaling providing assistance information. Similarly, the TX UE may update a gNB about ActiveTime and/or DRX information per destination if the ActiveTime has been changed for a destination.

It should be noted that from a UE perspective there may be only one "common" ActiveTime that is basically the superposition of corresponding ActiveTimes of all the destinations. If a SL UE has two separate DRX functions and/or ActiveTimes (e.g., one for the transmitting side and a separate one for the receiving side), a TX UE may inform a gNB about its TX DRX pattern and/or ActiveTime information per destination and also about any subsequent changes to it. In various embodiments, a TX UE informs a gNB about its TX DRX pattern and/or ActiveTime per destination as well as its RX DRX pattern and/or ActiveTime per source.

In certain embodiments, a TX UE may be only allowed to send HARQ retransmissions of a TB (e.g., SCI with non-toggled new data indicator ("NDI") during an ActiveTime if the ActiveTime is dynamically extended due to the reception of a NACK from a receiving UE for the TB. In some embodiments, a TX UE and an Rx UE extend their current ActiveTime (e.g., starting a timer such as a SLdrx-inactivitytimer or drx_RetransmissionTimerDL) by x ms if a NACK is transmitted by the RX UE and/or received by the TX UE for a PSSCH transmission. Since the TB couldn't be decoded successfully by the RX UE, further retransmission are necessary (e.g., ActiveTime is dynamically extended to be ready and/or awake for transmitting and/or receiving further retransmissions. It should be noted that it may be possible to transmit during ActiveTime initial transmissions (e.g., new TB) as well as retransmissions. In various embodiments, for a groupcast mode, if there are multiple receiving nodes, some of the receiving UEs transmit a NACK and other receiving UEs feedback an ACK. Only those UEs that transmit a NACK may extend their ActiveTime for further retransmissions. Therefore, a transmitting UE may during this extended ActiveTime only be allowed to perform further retransmissions of the TB. Any transmission of a new TB may not be received by those RX UEs that sent an ACK. In certain embodiments, a TX UE may be only allowed to send HARQ retransmissions of a TB (e.g., SCI with non-toggled NDI) during ActiveTime if the ActiveTime was dynamically extended due to the reception of a NACK from a receiving UE for this TB for groupcast transmissions. In some embodiments, for a unicast transmission mode, a TX UE may be allowed to also send initial transmissions (e.g., new TB) during the ActiveTime if ActiveTime was dynamically extended due to the reception of a NACK from a receiving UE.

In various embodiments, a TX UE uses only an autonomous resource allocation mode (e.g., mode 2) during a part of the ActiveTime that is dynamically extended due to certain events like the start of specific DRX-related timers (e.g., drx-inactivityTimerSL or drx-RetransmissionTimerSL). During the part of the ActiveTime that is semi-statically configured (e.g., Onduration Time), the TX UE uses a mode in which SL resources are scheduled by a gNB (e.g., mode 1).

In certain embodiments, a TX UE may be configured (e.g., preconfigured) to perform random resource selection during an extended time period and a configuration (e.g., preconfiguration) allows a TX UE to perform mode 2 resource allocation within a mode 1 resource pool during an extended time period. In some embodiments, a Tx UE is configured (e.g., preconfigured) with a separate resource pool for performing transmissions during an extended time period.

In various embodiments, an association between a SL resource allocation mode and ActiveTime part and/or components may facilitate that a synchronization between a gNB and a TX UE on a DRX pattern and/or ActiveTime may be simplified. The TX UE may only inform the gNB about a semi-statically configured ActiveTime (e.g., per destination) (e.g., the TX UE may inform the Onduration pattern and/or configuration to the gNB). It may also avoid the need to frequently update the gNB on the ActiveTime if the ActiveTime was dynamically extended. If transmissions and/or retransmissions are made using mode 2 resources, receiver UEs may be signalled explicitly if the transmitter has no more transmissions and/or retransmissions to transmit, allowing the receiver to sleep.

In certain embodiments, a TX UE indicates to a gNB that a PSSCH transmission was successfully received by peer RX UEs (e.g., ACK), and whether some further SL resources are required to transmit the data pending in a transmission buffer. In some embodiments, a TX UE signals an ACK and buffer status related information on a PUCCH. Buffer status reported information may include a one-bit field indicating whether additional SL resources are required. In such embodiments, the TX UE may signal two bits on the PUCCH (e.g., one bit for ACK and/or NACK and one bit for indicating whether additional SL resources are required). It should be noted that the gNB is not expected to have an accurate knowledge of the TX UEs buffer status.

In various embodiments, the TX UE triggers a SL BSR if SL DCI allocating SL resources for an initial transmission have not been received for "x" ms after the transmission of an ACK on PUCCH. This SL BSR trigger may ensure that a TX UE can indicate to the gNB that it has more data to transmit if a PSSCH transmission is successfully received by the peer receiving UEs. In certain embodiments, a TX UE may trigger a SL BSR if an amount of data available for transmission exceeds a certain predefined threshold and no SL DCI allocation SL resources for an initial transmission have been received for "x" ms after the transmission of an ACK on PUCCH.

In some embodiments, a TX UE forwards SL channel state information ("CSI") information received from a peer RX UE to a gNB. SL CSI information may enable the gNB to schedule SL resources more efficiently. For SL mode 1, the gNB assigns SL resources to the TX UE and the TX UE selects autonomously a modulation and coding scheme ("MCS") and/or TB size within allocated SL time and/or frequency resources. Since MCS and TB size selection is done autonomously by the TX UE (e.g., based on channel condition), the gNB cannot predict the results of the LCP procedure for SL transmissions. Therefore, the gNB has no accurate knowledge of a TX UEs buffer status even though SL base station ("BS") information is reported to the gNB. This may be different from a situation on a Uu interface, where gNB has some knowledge of the channel conditions and is capable of predicting a result of an LCP procedure performed by the UE for UL transmissions.

In various embodiments, a TX UE reports information on PC5 channel conditions (e.g., SL CSI or SL reference signal received power ("RSRP") measurement) to the gNB to allow the gNB to make efficient scheduling decisions.

In certain embodiments, a TX UE signals to peer RX UEs whether the RX UEs may go to ActiveTime for the next "x" ms. According to one implementation of such embodiments, SCI may indicate whether the RX UEs shall move to ActiveTime. One field (e.g., a one-bit flag) within the SCI may request the RX UE to move to ActiveTime (e.g., flag set to '1' requests the Rx UEs to go to ActiveTime). The ActiveTime may start a preconfigured offset to the SCI indicating the ActiveTime request and span over a predefined number of slots and/or ms. In some embodiments, SCI may indicate how many slots an ActiveTime period includes. In one implementation of such embodiments, the SCI is sent without an accompanying PSSCH (e.g., SCI-only transmission).

In various embodiments, for each SL LCH, SL service, SL application, and/or SL destination, a time resource configuration is preconfigured which is defined as a combination of an offset, a periodicity, and a time duration. This time resource configuration may enable the transmission of an indication from the transmitter UE to the receiving UE to prepare to receive transmission on the SL from the transmitter. During the preconfigured time periods (e.g., of the preconfigured time duration) which occur with the preconfigured periodicity, UEs interested in the particular SL service and/or application are ready to receive the new indication moving the UE to ActiveTime and receive SL data and monitor PSCCH. The TX side of a UE may need to be aware of when the peer RX UEs are "listening" for sidelink information and RX side of UE needs to know when to monitor for sidelink information such as a SCI. The duration of the time periods of the potential transmission of a new indication may span only a small number of SL slots (e.g., one or two SL slots). The configuration for the preconfigured time resource for the new indication may include a time period duration and periodicity, the periodicity being typically set to a short value to allow multiple opportunities for the transmitter UE to signal the RX UE to prepare for receiving SL transmissions. The TX side of a sidelink UE may indicate within those predefined time periods whether the peer receiving UEs shall move to ActiveTime to receive SL data of the corresponding SL LCH and/or SL service. In one implementation, such indication is signalled within the SCI. By having a preconfigured time resource pattern with a short periodicity per destination used for the transmission of sidelink control signalling (e.g., SCI requesting peer RX UEs to move to ActiveTime), it is possible to shape the ActiveTime between peer UEs based on the demand (e.g. based on data arrival). In certain embodiments, for resource allocation mode 1, a TX UE may, upon data arrival, request SL resources from the gNB by sending SR or SL BSR and request the peer RX UEs to go to ActiveTime such that the SL resources allocated by the gNB fall within the ActiveTime.

In some embodiments, a UE in slot "n" takes into consideration SCI on PSCCH, sidelink data on PSSCH, or feedback on PSFCH received until some (e.g., predefined) time offset before slot "n" to determine whether slot n is considered to be in ActiveTime or not. The offset may be fixed in a specification. Such "cut-off" time used for determining a DRX status of a sidelink slot—whether a slot is considered to be in ActiveTime or not—may facilitate that a UE has sufficient time to prepare a transmission (e.g., periodic inter-UE coordination message), which may be reported while UE is in ActiveTime. The DRX status (e.g., ActiveTime and/or non-ActiveTime) of a sidelink slot may change from slot to slot based on events such as the transmission and/or reception of a SCI or the transmission and/or reception of a feedback on PSFCH. Accordingly, it may not always be predictable by the TX and/or RX UEs whether a slot "n" is within ActiveTime or not. Since the UE needs some time to process received sidelink control signaling or information changing the DRX status, and also requires some time to prepare the transmission of a message (e.g., inter-UE coordination message), there may be some relaxation of reporting of messages during DRX.

In various embodiments, a TX UE informs the gNB that there is no data available for transmission to any of its peer receiving UEs that are active (e.g., receiving and therefore in their DRX active time now or in the immediate future). As another manifestation of this embodiment, a gNB may be informed if the TX UE has no more data to transmit to any of the destinations. In such embodiments, the TX UE indicates to the gNB that it is going to sleep (e.g., on the PC5 interface) for a specific time period, at least with respect to the transmit radio frequency ("RF") chain. If the RX RF chain can also sleep may depend on an indication from its peer receivers confirming that they do not have data for the transmitter. Any potential transmitter informs its corresponding receiver if no more data is available for transmission.

In certain embodiments, a TX UE may signal for how long it will enter sleep mode on the PC5 interface. Such indication may be signalled within a MAC CE or RRC signaling (e.g., assistance information). If there is no explicit signalling for a time period of sleep, a next on-duration timer may be used to assume the time if the transmitter goes active. The gNB may explicitly indicate to the TX UE that it will not provide any SL resources (e.g., SL DCI) for the next x ms. Based on a received indication, the TX UE may update its ActiveTime.

Figure 6:
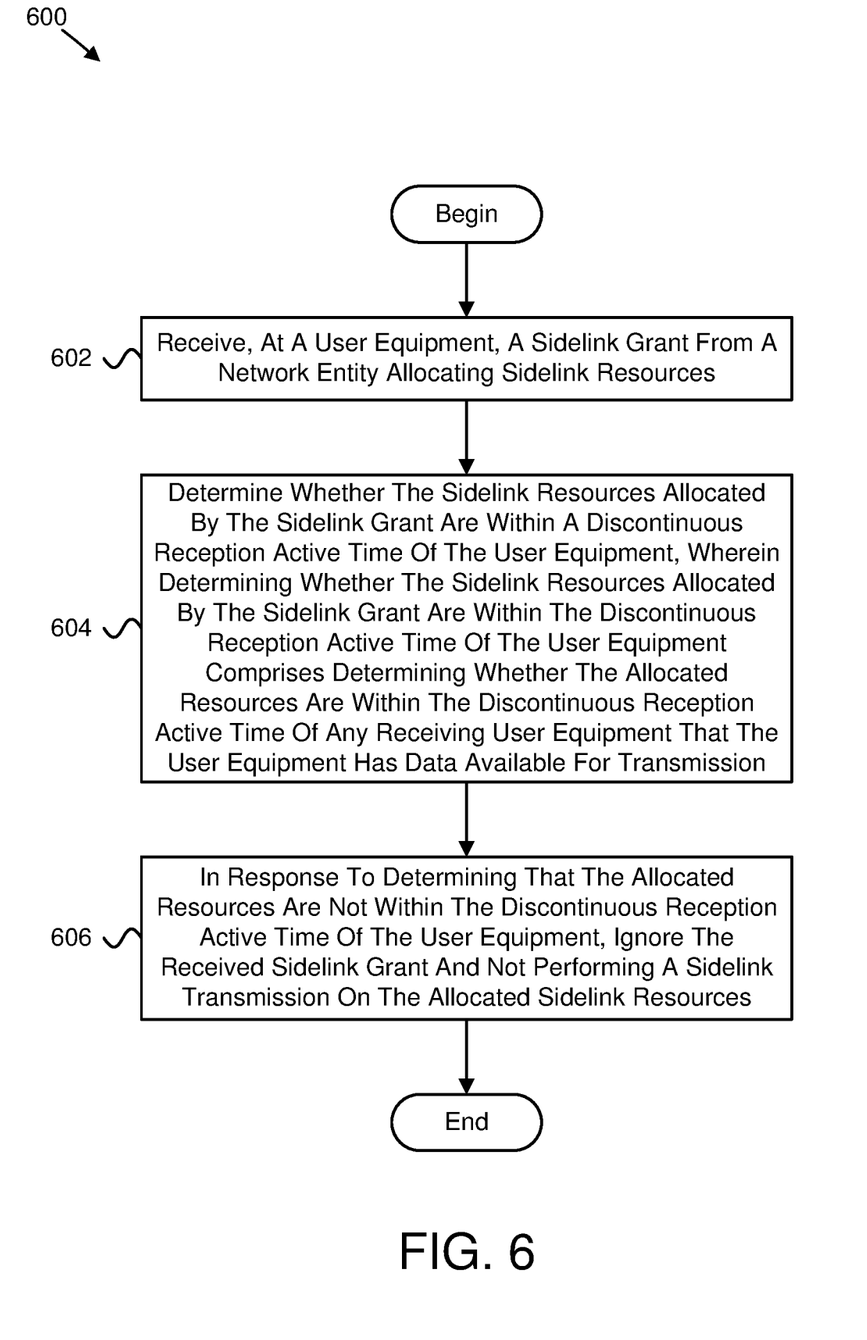
FIG. 6 is a flow chart diagram illustrating one embodiment of a method for configuring resources corresponding to discontinuous reception.

FIG. 6 is a flow chart diagram illustrating one embodiment of a method 600 for configuring resources corresponding to discontinuous reception. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, at a user equipment, a sidelink grant from a network entity allocating sidelink resources. In some embodiments, the method 600 includes determining 604 whether the sidelink resources allocated by the sidelink grant are within a discontinuous reception active time of the user equipment. Determining whether the sidelink resources allocated by the sidelink grant are within the discontinuous reception active time of the user equipment includes determining whether the allocated resources are within the discontinuous reception active time of any receiving user equipment that the user equipment has data available for transmission. In certain embodiments, the method 600 includes, in response to determining that the allocated resources are not within the discontinuous reception active time of the user equipment, ignoring 606 the received sidelink grant and not performing a sidelink transmission on the allocated sidelink resources.

In certain embodiments, the method 600 further comprises inhibiting sidelink transmission at a user equipment on the sidelink resources allocated from the sidelink grant to the user equipment in response to the sidelink resources not being within the discontinuous reception active time of the user equipment. In one embodiment, the method 600 further comprises signaling a hybrid automatic repeat request acknowledgment "ACK" to the network entity in response to receiving the sidelink grant allocating sidelink resources which are not within the discontinuous reception active time of the user equipment. In some embodiments, the method 600 further comprises: signaling an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the user equipment.

In various embodiments, the method 600 further comprises only considering a sidelink logical channel for a logical channel prioritization procedure in response to resources allocated by a sidelink grant for the sidelink logical channel being within the discontinuous reception active time of the user equipment. In one embodiment, the method 600 further comprises transmitting information indicating discontinuous reception active time information per destination.

Figure 7:
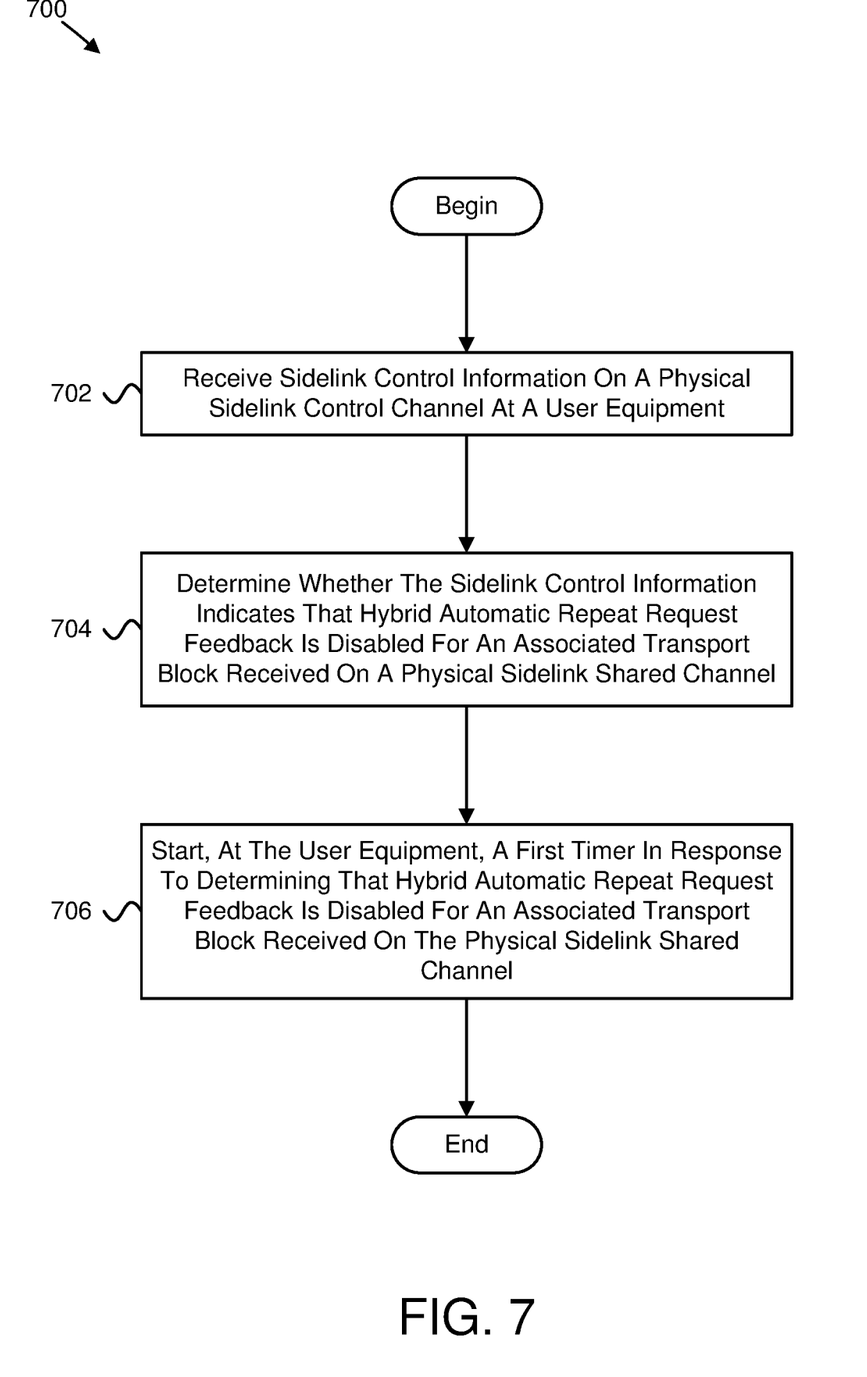
FIG. 7 is a flow chart diagram illustrating another embodiment of a method for configuring resources corresponding to discontinuous reception.

FIG. 7 is a flow chart diagram illustrating another embodiment of a method 700 for configuring resources corresponding to discontinuous reception. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a user equipment, sidelink control information on a physical sidelink control channel at a user equipment. In some embodiments, the method 700 includes determining 704 whether the sidelink control information indicates that hybrid automatic repeat request feedback is disabled for an associated transport block received on a physical sidelink shared channel. In certain embodiments, the method 700 includes starting 706, at the user equipment, a first timer in response to determining that hybrid automatic repeat request feedback is disabled for an associated transport block received on the physical sidelink shared channel.

In certain embodiments, the method 700 further comprises considering, at the user equipment, a time period during which the first timer is running as a discontinuous reception active time. In some embodiments, the method 700 further comprises monitoring the physical sidelink control channel for the sidelink control information while the first timer is running.

In various embodiments, the method 700 further comprises considering sidelink resources indicated within the sidelink control information as reserved resources being within a discontinuous reception active time of the user equipment. In one embodiment, the first timer is stopped in response to decoding the associated sidelink transport block successfully.

In certain embodiments, the method 700 further comprises, in response to determining that hybrid automatic repeat request feedback is enabled for the associated transport block, transmitting a negative acknowledgement on a sidelink feedback channel, and, in response to transmitting the negative acknowledgement, starting a second timer. In some embodiments, the method 700 further comprises considering a time period during which the second timer is running as active time.

In one embodiment, a method comprises: receiving, at a user equipment, a sidelink grant from a network entity allocating sidelink resources; determining whether the sidelink resources allocated by the sidelink grant are within a discontinuous reception active time of the user equipment, wherein determining whether the sidelink resources allocated by the sidelink grant are within the discontinuous reception active time of the user equipment comprises determining whether the allocated resources are within the discontinuous reception active time of any receiving user equipment that the user equipment has data available for transmission; and, in response to determining that the allocated resources are not within the discontinuous reception active time of the user equipment, ignoring the received sidelink grant and not performing a sidelink transmission on the allocated sidelink resources.

In certain embodiments, the method further comprises inhibiting sidelink transmission at a user equipment on the sidelink resources allocated from the sidelink grant to the user equipment in response to the sidelink resources not being within the discontinuous reception active time of the user equipment.

In one embodiment, the method further comprises signaling a hybrid automatic repeat request acknowledgment "ACK" to the network entity in response to receiving the sidelink grant allocating sidelink resources which are not within the discontinuous reception active time of the user equipment.

In some embodiments, the method further comprises: signaling an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the user equipment.

In various embodiments, the method further comprises only considering a sidelink logical channel for a logical channel prioritization procedure in response to resources allocated by a sidelink grant for the sidelink logical channel being within the discontinuous reception active time of the user equipment.

In one embodiment, the method further comprises transmitting information indicating discontinuous reception active time information per destination.

In one embodiment, an apparatus comprises: a receiver that receives, at a user equipment, a sidelink grant from a network entity allocating sidelink resources; and a processor that: determines whether the sidelink resources allocated by the sidelink grant are within a discontinuous reception active time of the user equipment, wherein determining whether the sidelink resources allocated by the sidelink grant are within the discontinuous reception active time of the user equipment comprises determining whether the allocated resources are within the discontinuous reception active time of any receiving user equipment that the user equipment has data available for transmission; and, in response to determining that the allocated resources are not within the discontinuous reception active time of the user equipment, ignores the received sidelink grant and not performing a sidelink transmission on the allocated sidelink resources.

In certain embodiments, the processor inhibits sidelink transmission at a user equipment on the sidelink resources allocated from the sidelink grant to the user equipment in response to the sidelink resources not being within the discontinuous reception active time of the user equipment.

In one embodiment, the apparatus further comprises a transmitter that signals a hybrid automatic repeat request acknowledgment "ACK" to the network entity in response to receiving the sidelink grant allocating sidelink resources which are not within the discontinuous reception active time of the user equipment.

In some embodiments, the apparatus further comprises a transmitter that: signals an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the user equipment.

In various embodiments, the processor only considers a sidelink logical channel for a logical channel prioritization procedure in response to resources allocated by a sidelink grant for the sidelink logical channel being within the discontinuous reception active time of the user equipment.

In one embodiment, the apparatus further comprises a transmitter that transmits information indicating discontinuous reception active time information per destination.

In one embodiment, a method comprises: receiving sidelink control information on a physical sidelink control channel at a user equipment; determining whether the sidelink control information indicates that hybrid automatic repeat request feedback is disabled for an associated transport block received on a physical sidelink shared channel; and starting, at the user equipment, a first timer in response to determining that hybrid automatic repeat request feedback is disabled for an associated transport block received on the physical sidelink shared channel.

In certain embodiments, the method further comprises considering, at the user equipment, a time period during which the first timer is running as a discontinuous reception active time.

In some embodiments, the method further comprises monitoring the physical sidelink control channel for the sidelink control information while the first timer is running.

In various embodiments, the method further comprises considering sidelink resources indicated within the sidelink control information as reserved resources being within a discontinuous reception active time of the user equipment.

In one embodiment, the first timer is stopped in response to decoding the associated sidelink transport block successfully.

In certain embodiments, the method further comprises, in response to determining that hybrid automatic repeat request feedback is enabled for the associated transport block, transmitting a negative acknowledgement on a sidelink feedback channel, and, in response to transmitting the negative acknowledgement, starting a second timer.

In some embodiments, the method further comprises considering a time period during which the second timer is running as active time.

In one embodiment, an apparatus comprises: a receiver that receives sidelink control information on a physical sidelink control channel at a user equipment; and a processor that: determines whether the sidelink control information indicates that hybrid automatic repeat request feedback is disabled for an associated transport block received on a physical sidelink shared channel; and starts, at the user equipment, a first timer in response to determining that hybrid automatic repeat request feedback is disabled for an associated transport block received on the physical sidelink shared channel.

In certain embodiments, the processor considers, at the user equipment, a time period during which the first timer is running as a discontinuous reception active time.

In some embodiments, the processor monitors the physical sidelink control channel for the sidelink control information while the first timer is running.

In various embodiments, the processor considers sidelink resources indicated within the sidelink control information as reserved resources being within a discontinuous reception active time of the user equipment.

In one embodiment, the first timer is stopped in response to decoding the associated sidelink transport block successfully.

In certain embodiments, the apparatus further comprises a transmitter that, in response to determining that hybrid automatic repeat request feedback is enabled for the associated transport block, transmits a negative acknowledgement on a sidelink feedback channel, and, in response to transmitting the negative acknowledgement, the processor starts a second timer.

In some embodiments, the processor considers a time period during which the second timer is running as active time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment, the method comprising:
   receiving a sidelink grant from a network entity allocating sidelink resources;
   determining whether the sidelink resources allocated by the sidelink grant are within a discontinuous reception active time of the UE, wherein determining whether the sidelink resources allocated by the sidelink grant are within the discontinuous reception active time of the UE comprises determining whether the allocated resources are within the discontinuous reception active time of any receiving UE that the UE has data available for transmission; and
   in response to determining that the allocated resources are not within the discontinuous reception active time of the UE, ignoring the received sidelink grant and not performing a sidelink transmission on the allocated sidelink resources.

2. The method of claim 1, further comprising inhibiting sidelink transmission at a UE on the sidelink resources allocated from the sidelink grant to the UE in response to the sidelink resources not being within the discontinuous reception active time of the UE.

3. The method of claim 1, further comprising:
signaling a hybrid automatic repeat request (HARQ) acknowledgment (ACK) to the network entity in response to receiving the sidelink grant allocating sidelink resources which are not within the discontinuous reception active time of the UE.

4. The method of claim 1, further comprising:
signaling an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the UE.

5. The method of claim 1, further comprising only considering a sidelink logical channel for a logical channel prioritization procedure in response to resources allocated by a sidelink grant for the sidelink logical channel being within the discontinuous reception active time of the UE.

6. A user equipment (UE), comprising:
at least one memory; and
at least one processor coupled with the at least one memory and configured to cause the UE to:
receive, at the UE, a sidelink grant from a network entity allocating sidelink resources;
determine whether the sidelink resources allocated by the sidelink grant are within a discontinuous reception active time of the UE, wherein determining whether the sidelink resources allocated by the sidelink grant are within the discontinuous reception active time of the UE comprises determining whether the allocated resources are within the discontinuous reception active time of any receiving UE that the UE has data available for transmission; and
in response to determining that the allocated resources are not within the discontinuous reception active time of the UE, ignore the received sidelink grant and not performing a sidelink transmission on the allocated sidelink resources.

7. The UE of claim 6, wherein the at least one processor is configured to cause the UE to signal a hybrid automatic repeat request (HARQ) acknowledgment (ACK) to the network entity in response to receiving the sidelink grant allocating sidelink resources which are not within the discontinuous reception active time of the UE.

8. The UE of claim 6, wherein the at least one processor is configured to cause the UE to signal an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the UE.

9. The UE of claim 6, wherein the at least one processor is configured to cause the UE to only consider a sidelink logical channel for a logical channel prioritization procedure in response to resources allocated by a sidelink grant for the sidelink logical channel being within the discontinuous reception active time of the UE.

10. The UE of claim 6, wherein the at least one processor is configured to cause the UE to transmit information indicating discontinuous reception active time information per destination.

11. A processor for wireless communication, comprising:
at least controller coupled with at least one memory and configured to cause the processor to:
receive a sidelink grant from a network entity allocating sidelink resources;
determine whether the sidelink resources allocated by the sidelink grant are within a discontinuous reception active time of the processor, wherein determining whether the sidelink resources allocated by the sidelink grant are within the discontinuous reception active time of the processor comprises determining whether the allocated resources are within the discontinuous reception active time of any receiving processor that the processor has data available for transmission; and
in response to determining that the allocated resources are not within the discontinuous reception active time of the processor, ignore the received sidelink grant and not performing a sidelink transmission on the allocated sidelink resources.

12. The processor of claim 11, wherein the at least one controller is configured to cause the processor to signal a hybrid automatic repeat request (HARQ) acknowledgment (ACK) to the network entity in response to receiving the sidelink grant allocating sidelink resources which are not within the discontinuous reception active time of the processor.

13. The processor of claim 11, wherein the at least one controller is configured to cause the processor to signal an indication to a network entity in response to not performing a sidelink transmission on the allocated resources, wherein the indication indicates that the sidelink transmission was not performed on the allocated resources according to the sidelink grant since the allocated resources are not within the discontinuous reception active time of the processor.

14. The processor of claim 11, wherein the at least one controller is configured to cause the processor to only consider a sidelink logical channel for a logical channel prioritization procedure in response to resources allocated by a sidelink grant for the sidelink logical channel being within the discontinuous reception active time of the processor.

15. The processor of claim 11, wherein the at least one controller is configured to cause the processor to transmit information indicating discontinuous reception active time information per destination.

* * * * *